United States Patent Office 3,657,377
Patented Apr. 18, 1972

3,657,377
JET FUEL PRODUCTION
Jacob D. Kemp, El Cerrito, Calif., assignor to Chevron
Research Company, San Francisco, Calif.
No Drawing. Filed Jan. 19, 1970, Ser. No. 4,054
Int. Cl. C07c 3/56
U.S. Cl. 260—683.48
1 Claim

ABSTRACT OF THE DISCLOSURE

An alkylation process for producing jet fuel from hydrocarbons which comprises (a) contacting an isoparaffin feedstock with an olefin feedstock in the presence of hydrofluoric acid at a temperature between about 30° and 100° F. in a reaction zone, (b) maintaining the ratio of isoparaffin to olefin below 2.0 in said reaction zone, and (c) withdrawing from said reaction zone an effluent containing at least 10 weight percent hydrocarbon boiling between about 300° and 550° F., exclusive of any acid oil produced in said reaction zone.

BACKGROUND OF THE INVENTION

The present invention relates to an alkylation process. More particularly, the present invention relates to a process of alkylating isoparaffins with olefins using hydrofluoric acid as the alkylation catalyst.

The HF alkylation process was commercialized during World War II, and has been extensively used in many refineries during the past 20 years. Many publications have described the process, such as Hydrofluoric Acid Alkylation, published in 1946 by the Phillips Petroleum Company; Advances in Catalysis, vol. I, pages 27–64, especially pages 59–63, (Academic Press, Inc., 1948); Advances in Petroleum Chemistry and Refining, vol. III, Chapter 6 (Interscience Publishers, Inc., 1960); and, particularly "Catalytic Alkylation," by Cupit et al. in Petroleum Management, vol. 33 (December 1961), pages 203–215 and vol. 34 (January 1962), pages 207–217. The disclosures in the foregoing references are incorporated herein.

Alkylation processes include the alkylation of paraffins, isoparaffins, aromatic compounds, cycloaliphatic compounds, etc., with olefinic hydrocarbons. The alkylation reaction may take place over a wide range of temperature ranging from below 0° F. when alkylating isoparaffins to as high as about 600° F. when certain aromatic compounds are reacted with olefins. It may be conveniently carried out under pressures at or below atmospheric or as high as several hundred atmospheres.

The major alkylation process in use today involves the reaction of isoparaffins with olefins in the presence of an acid catalyst to form valuable high octane gasoline components. The isoparaffins used may be isobutane, isopentane, isohexane, etc., or mixtures thereof. Olefins more often reacted are propylene, butylene, pentylene, their isomers, and mixtures thereof. In addition, one may utilize any proportions of the above as feedstocks, as well as mixtures of isoparaffins and olefins with or without the presence of normal paraffins.

Various methods of preparing high octane alkylates by reacting olefins with paraffins, such as isoparaffins, are known. These methods include liquid phase catalytic alkylations with (1) hydrogen fluoride and (2) concentrated sulfuric acid. In general, these methods are carried out by adding an olefin to an excess of an isoparaffin hydrocarbon mixed thoroughly with the catalyst. Excess isoparaffin is separated after alkylation and recirculated. Sufficient pressure is employed during the process to keep the reactants in the liquid phase. Higher temperatures can be employed with HF, such as 70–115° F., but lower temperatures, for example, 30–50° F., are employed with $H_2SO_4$ to suppress side reactions.

In a typical commercial alkylation, isobutane and the acid catalyst are introduced into an alkylation reaction zone, and are agitated to form an emulsion, this being the preferred method of assuring intimate contact between the acid catalyst and the hydrocarbon to be alkylated. The major portion of the isobutane feed is provided by a recycle stream obtained from subsequent distillation steps. The alkylation feed which contains olefin reactant also contains isobutane, butylene, propane, propylene, and frequently small quantities of lighter paraffins. The temperature in the reaction zone may be maintained at a constant low level by vaporizing therefrom the lighter components in the reaction products, more usually a mixture of butane, isobutane, propane, and any lower boiling compounds. Because of the high concentration of isobutane in the reactor liquid, these vapors are predominantly isobutane. The vapors are compressed and condensed, and the condensate after the removal of propane and the lighter components is returned to the alkylation reaction zone in the isobutane recycle. The alkylation mixture leaving the last reaction stage, comprising a mixture of alkylate, acid and unreacted hydrocarbons, passes into a settling zone wherein equilibrium acid catalyst, containing polymers and other impurities and herein referred to as "acid oil," is separated from the alkylate and unreacted isobutane. A portion of the equilibrium acid is recycled to the contacting zone and the remainder is either purified for reuse, used in another process where a high degree of purity is not required, or is discarded. Alkylate and unreacted isobutane are further processed to separate the alkylate, and the isobutane is recycled to the contacting zone.

According to the prior art, alkylation has been used to produce motor gasoline or aviation gasoline having a boiling range of above $C_5$ to 300° F.

According to the prior art, alkylation is not typically used to produce jet fuel. The term "jet fuel" is used herein to mean a hydrocarbon fraction boiling within the range of about 300°–550° F. and having characteristics which make the hydrocarbon suitable for use as a jet fuel, including unsaturated hydrocarbons contained below about 5 weight percent. Jet fuels are produced according to the prior art by fractionating a hydrocarbon cut boiling between about 300° and 550° F., followed by hydrogenation, if necessary, to saturate unsaturates present in the hydrocarbon fraction. Jet fuels have also been produced by hydrocracking or catalytically cracking relatively heavy hydrocarbon stocks to convert them to hydrocarbon materials boiling in the jet fuel range.

SUMMARY OF THE INVENTION

According to the present invention, process is provided for producing jet fuel from hydrocarbons by an alkylation process which comprises (a) contacting an isoparaffin feedstock with an olefin feedstock in the presence of hydrofluoric acid at a temperature between about 30° and 130° F. in a reaction zone, (b) maintaining the ratio of isoparaffin to olefin below 2.0 in said reaction zone, and (c) withdrawing from said reaction zone an effluent containing at least 10 weight percent hydrocarbon boiling between about 300° and 550° F., exclusive of any acid oil produced in said reaction zone.

I have found that if a HF process is operated in accordance with the present invention, unexpectedly high yields of jet fuel are obtained. This is attractive at present because of the high jet fuel demand, and especially in view of the fact that the jet fuel demand is increasing at a faster rate than that of the motor gasoline demand. The process of the present invention is also particularly attractive in that distillation requirements for an alkylation process in accordance with the present invention are substantially reduced relative to distillation equipment investment required in an alkylation plant in accordance with the prior art. In an alkylation process for the production of motor gasoline or aviation fuel, large quantities of isobutane are recycled to the alkylation reaction zone. This requires extensive distillation facilities and, in particular, one or more large distillation columns to separate isobutane from the alkylate and normal butane present in the effluent from the alkylation reaction zone. In accordance with the present invention, relatively very little isobutane or other isoparaffin is recycled to the reaction zone, which consequently allows a substantial saving in the distillation section investment for the alkylation plant.

I have found that with a low isoparaffin-to-olefin ratio, preferably below 2 parts isoparaffin to 1 part olefin by weight, an HF alkylation process can be used to achieve good yields of jet fuel, for example, as high as 50 to 60 weight percent jet fuel. Prior art alkylation processes operate at external or feed isoparaffin-to-olefin ratios of about 5:1 and usually within the range of about 3:1 to 20:1. The ratio of isobutane to butylenes in the total feed to an alkylation reaction zone in accordance with the prior art is still much higher as the total feed to the reactor includes a large recycle isobutane stream. Thus, the ratio of isobutane to butylenes or the ratio of isoparaffins to olefins in the total feed to an alkylation reactor in accordance with the prior art is often as high as 50:1.

I have also determined that HF alkylation is satisfactory for the process of the present invention, whereas $H_2SO_4$ alkylation is believed only to be operable but not completely satisfactory and unpreferred relative to HF alkylation. Preferably, the temperature used in the HF alkylation reaction zone of the present invention is between 30° and 130° F., the pressure is between about 10 and 2000 p.s.i.g. and sufficient to operate in the liquid phase. The volume of olefin added per hour per volume of HF present in the reaction zone is preferably between 0.01 and 0.8. When operating within these ranges in accordance with the present invention, a jet fuel yield based on olefin of at least 10 weight percent and usually between 30 and 70 weight percent, exclusive of any acid oil produced in the reaction zone, can be achieved.

Preferably the isoparaffin feed to the reaction zone is a $C_4$ to $C_{10}$ hydrocarbon feedstock containing tertiary carbon atoms present as paraffins or as naphthenes. Tertiary carbon atoms are carbon atoms to which three other carbon atoms are attached. The olefin feed is preferably a $C_3$ to $C_{20}$ hydrocarbon. Isopentane is a particularly preferred isoparaffin feed, as I have found that high yields of jet fuel can be obtained using $C_5$ as a feedstock. Particularly preferred olefin feedstocks are $C_6$ to $C_{10}$ olefins and even higher molecular weight olefins. Particularly high yields have been achieved with $C_8$ to $C_{12}$ olefins, for example, using decene-1, a jet fuel yield of 149 weight percent based on decene-1 is obtained.

Isoparaffin-to-olefin ratios below 1.0 are particularly preferred in accordance with the present invention, and these very low ratios of isoparaffins to olefins are particularly advantageous to obtain high jet fuel yields when feeding relatively low carbon number olefin feedstocks, for example, $C_3$ to $C_5$.

Isoparaffin-to-olefin ratios used herein are on a weight basis. Also, the ratios are for that of the total feed to the alkylation reaction zone rather than simply the external or fresh feed to the alkylation reaction zone.

I have found that when operating in accordance with the present invention, surprisingly a substantial amount of naphthenes are usually produced. Usually about 1.0 liquid volume percent naphthenes or more are produced. At particularly low isoparaffin-to-olefin ratios, for example, below about 1.0, the naphthenes produced are as much as 10 to 22 volume percent of the jet fuel fraction.

Examples

Tables I–VI below summarize several laboratory runs exemplifying the process of the present invention. Analyses for the feed and the product are tabulated in the tables.

TABLE I.—REACTION OF BUTENE-1 AND ISOBUTANE, BUTENE-1 AND ISOPENTANE

| | Run Number | | | | | |
|---|---|---|---|---|---|---|
| | 13 | | 16 | | 7 | |
| Temp., ° F | 95 | | 95 | | 95 | |
| Vol. butene/vol. HF/hr | 0.28 | | 0.21 | | 0.27 | |
| Stirrer, r.p.m | 1,500 | | 1,500 | | 1,500 | |
| | Feed | Total prod. | Feed | Total prod. | Feed | Total prod. |
| Analysis, wt. percent: | | | | | | |
| Butene-1 | 73.73 | | 50.74 | | 49.70 | |
| Propane | | | | | | |
| Isobutane | 26.14 | 5.36 | 49.02 | 13.50 | | 8.57 |
| n-Butane | 0.13 | 0.60 | 0.24 | 0.53 | | 0.70 |
| Isopentane | | 4.01 | | 4.99 | 49.09 | 6.77 |
| n-Pentane | | | | | 1.21 | 1.19 |
| $C_6$ | | 2.61 | | 3.60 | | 4.57 |
| $C_7$ | | 2.43 | | 3.52 | | 3.48 |
| $C_8$ | | 8.79 | | 19.39 | | 7.47 |
| $C_9$ | | 12.97 | | 19.90 | | 19.46 |
| $C_{10}+$ | | 51.55 | | 31.78 | | 42.00 |
| Acid oil | | 11.70 | | 2.80 | | 5.75 |
| Ratio of isoparaffin to olefin | ~.35 | | ~1.0 | | ~1.0 | |
| Wt. $iC_4$ consumed/wt. $C_4+$ | | 0.28 | | 0.70 | | −0.17 |
| Wt. $iC_5$ consumed/wt. $C_4+$ | | −0.054 | | −0.10 | | 0.85 |
| Wt. $nC_4$ prod./wt. $C_4+$ | | 0.006 | | 0.006 | | 0.01 |
| Wt. $C_6$-$C_9$ prod./wt. $C_4+$ | | 0.37 | | 0.92 | | 0.70 |
| Wt. $C_{10}+$ prod./wt. $C_4+$ | | 0.70 | | 0.63 | | 0.84 |
| Wt. acid oil/wt. $C_4$ | | 0.16 | | 0.055 | | 0.116 |
| Product inspections | $C_6$-$C_9$ | $C_{10}+$ | $C_6$-$C_9$ | $C_{10}+$ | $C_6$-$C_9$ | $C_{10}+$ |
| °API, gravity | 70.2 | 52.7 | 69.7 | 54.8 | 70.2 | 54.0 |
| Br. No | 0.15 | 0.57 | 0.07 | 1.1 | 0.11 | 0.18 |
| F-1+3 g. TEL/gal. Octane No | 97.0 | | | | 94.4 | |
| F-2+3 g. TEL/gal. octane No | 100.7 | | | | 97.5 | |
| PNA, LV percent: | | | | | | |
| Paraffins | 99.5 | 76.9 | 96.5 | 88.9 | 97.3 | 86.1 |
| Naphthenes | 0.5 | 22.2 | 3.1 | 10.9 | 2.5 | 13.9 |
| Aromatics | 0.0 | 0.9 | 0.4 | 0.2 | 0.2 | 0.0 |

The data was obtained using a magnetically stirred stainless steel reactor vessel. The internal volumetric space of the reactor vessel was approximately 1300 cubic centimeters. For the various runs tabulated in the following tables, approximately 375 cubic centimeters of anhydrous liquid hydrofluoric acid was initially charged to the reactor vessel. The temperature of the vessel was then adjusted to about 95° F. and the isoparaffin-olefin hydrocarbon feedstock was charged to the reactor while the contents of the reactor were stirred. The hydrocarbon feedstock was added continuously for about 4–6 hours for the various runs tabulated in the tables below. After this reaction period, the reactor was cooled. The hydrocarbon phase was removed and analyzed to obtain the product results as tabulated in the tables below.

As can be seen from Table I, when using an isobutane-to-olefin ratio of only about 0.35:1.0, a very high jet fuel yield was obtained. Substantially all of the $C_{10}+$ product boils in the jet fuel range and the $C_{10}+$ present in the product was 51.55 percent. The yield of $C_{10}+$ product based on weight percent olefin feed was 70 percent. However, the acid oil production for Run No. 13 using isobutane was essentially double that for Run No. 7 using isopentane. The yield of $C_{10}+$ product based on weight percent olefin feed using isopentane as the isoparaffin feed was 84 percent.

The data summarized in Table II illustrate that the process of the present invention can be carried out successfully using a feed comprising $C_3$ olefin. The yield of $C_{10}+$ product using a mixed feed of propylene and butene-1 olefins was about 78 weight percent versus 70 percent using essentially only butene-1 olefin. In both cases (i.e., runs 31 and 13), the olefins were reacted with isobutane.

The data summarized in Table III below illustrate that the process of the present invention can be carried out successfully using $C_5$ olefins as a feed stock. Table III also illustrates (Run 15 versus Run 19) a considerably higher yield of $C_{10}+$, or jet fuel, using relatively low isoparaffin to olefin ratios in the feed to the reactor. At a 1.0 isopentane to pentene-1 ratio, the $C_{10}+$ yield was 94 weight percent whereas at a ratio of 3.9 parts isopentane to one part pentene-1, the $C_{10}+$ yield was 77 weight percent.

TABLE II.—REACTION OF BUTENE-1, PROPYLENE AND ISOBUTANE

| | Run number | | | |
|---|---|---|---|---|
| | 31 | | 13 | |
| Temp., °F | 95 | | 95 | |
| Vol. olefin/vol. HF/hr | 0.35 | | 0.28 | |
| Stirrer, r.p.m | 1,500 | | 1,500 | |
| | Feed | Total prod. | Feed | Total prod. |
| Analysis, wt. percent: | | | | |
| Propylene | 37.60 | | | |
| Butene-1 | 37.42 | | 73.73 | |
| Propane | | 1.56 | | |
| Isobutane | 24.86 | 2.68 | 26.14 | 5.36 |
| n-Butane | 0.12 | .35 | 0.13 | 0.60 |
| Isopentane | | 2.21 | | 4.01 |
| n-Pentane | | | | |
| $C_6$ | | 2.47 | | 2.61 |
| $C_7$ | | 5.07 | | 2.43 |
| $C_8$ | | 5.36 | | 8.79 |
| $C_9$ | | 10.40 | | 12.97 |
| $C_{10}+$ | | 58.68 | | 51.55 |
| Acid oil | | 11.20 | | 11.70 |
| Ratio of isoparaffin to olefin | .35 | | .35 | |
| Wt. $iC_4$ consumed/wt. olefin | 0.30 | | 0.28 | |
| Wt. propane/wt. olefin | 0.02 | | 0.00 | |
| Wt. $nC_4$ prod./wt. olefin | 0.003 | | 0.006 | |
| Wt. $iC_5$ prod./wt. olefin | 0.03 | | 0.05 | |
| Wt. $C_6$–$C_9$ prod./wt. olefin | 0.31 | | 0.37 | |
| Wt. $C_{10}+$ prod./wt. olefin | 0.78 | | 0.70 | |
| Wt. Acid oil/wt. olefin | 0.15 | | 0.16 | |
| Product inspections | $C_6$–$C_9$ | $C_{10}+$ | $C_6$–$C_9$ | $C_{10}+$ |
| °API gravity | 70.4 | 52.1 | 70.2 | 52.7 |
| Br. No | 0.2 | 2.0 | 0.15 | 0.57 |
| PNA, LV percent: | | | | |
| Paraffins | 93.7 | 85.8 | 99.5 | 76.9 |
| Naphthenes | 6.0 | 14.2 | 0.5 | 22.0 |
| Aromatics | 0.4 | 0.0 | 0.0 | 0.9 |

TABLE III.—REACTION OF PENTENE-1, ISOBUTANE AND PENTENE-1, ISOPENTANE

| | Run Number | | | | | |
|---|---|---|---|---|---|---|
| | 10 | | 15 | | 19 | |
| Temp., °F | 93 | | 95 | | 95 | |
| Vol. pentene/vol. HF/hr | 0.18 | | 0.19 | | 0.086 | |
| Stirrer, r.p.m | 1,500 | | 1,500 | | 1,500 | |
| | Feed | Total prod. | Feed | Total prod. | Feed | Total prod. |
| Analysis, wt. percent: | | | | | | |
| Pentene-1 | 50.09 | | 50.3 | | 20.00 | |
| Isobutane | 49.66 | 16.25 | 5.86 | | | 12.52 |
| n-Butane | 0.25 | .41 | 0.16 | | | 0.26 |
| Isopentane | | 11.00 | 48.6 | | 78.08 | 31.31 |
| n-Pentane | | 1.32 | 1.2 | | 1.42 | 2.53 |
| $C_6$ | | 6.22 | | | 5.47 | 13.43 |
| $C_7$ | | 3.76 | | | 3.76 | 4.22 |
| $C_8$ | | 5.81 | | | 3.96 | 2.62 |
| $C_9$ | | 20.54 | | | 19.71 | 17.74 |
| $C_{10}+$ | | 33.26 | | | 47.47 | 15.32 |
| Acid oil | | 1.44 | | | 4.48 | 0.06 |
| Ratio of isoparaffin to olefin | 1.0 | | 1.0 | | 3.9 | |
| Wt. $iC_4$ consumed/wt. $C_5^=$ | | 0.67 | | −0.12 | | −0.64 |
| Wt. $iC_5$ consumed/wt. $C_5^=$ | | −0.20 | | 0.83 | | 2.34 |
| Wt. $nC_4$/wt. $C_5^=$ | | 0.003 | | 0.00 | | 0.00 |
| Wt. $nC_5$ prod./wt. $C_5^=$ | | 0.03 | | 0.02 | | 0.03 |
| Wt. $C_6$–$C_9$ prod./wt. $C_5^=$ | | 0.73 | | 0.65 | | 1.40 |
| Wt. $C_{10}+$ prod./wt. $C_5^=$ | | 0.67 | | 0.94 | | 0.77 |
| Wt. acid oil/wt. $C_5^=$ | | 0.029 | | 0.09 | | 0.003 |
| Product inspections | $C_6$–$C_9$ | $C_{10}+$ | $C_6$–$C_9$ | $C_{10}+$ | $C_6$–$C_9$ | $C_{10}+$ |
| °API gravity | 70.8 | 54.1 | 70.6 | 54.3 | 74.8 | 58.8 |
| Br. No | 0.05 | 0.11 | 0.11 | 0.40 | 0.05 | 0.06 |
| F-1+3 g. TEL/gal. oct. No | 93.1 | | 92.0 | | | |
| F-2+3 g. TEL/gal. oct. No | 95.7 | | 92.5 | | | |
| PNA, LV percent: | | | | | | |
| Paraffins | 95.3 | 82.8 | 97.6 | 88.1 | 99.8 | 97.1 |
| Naphthenes | 4.7 | 17.2 | 2.4 | 11.9 | 0.0 | 2.5 |
| Aromatics | 0.0 | 0.0 | 0.0 | 0.0 | 0.2 | 0.4 |

The data summarized in Table IV illustrate the process of the present invention applied to a $C_5$-$C_6$ hydrocarbon cut obtained from catalytic cracking, in particular, fluid catalytic cracking (FCC). As shown in the table, using the process of the present invention, including operation at an isoparaffin to olefin feed ratio of about 1.5 by weight, a yield of 72 weight percent jet fuel was obtained. Thus the process of the present invention is particularly attractive in refineries or process embodiments including a catalytic cracking unit. The process of the present invention also finds particularly advantageous application in process embodiments including a hydroconversion step, such as hydrocracking, as the process of the present invention provides a method to combine light paraffins, such as isobutane and isopentane generated in the hydroconversion process, with olefins to obtain valuable jet fuel.

TABLE IV.—REACTION OF FCC $C_5$-$C_6$ FRACTION AND ISOPENTANE

| | Run number 34 | | | |
|---|---|---|---|---|
| Temp., ° F | 95 | | | |
| Vol. $C_5$-$C_6$ cut vol./HF/hr | 0.24 | | | |
| Feed composition wt. percent: | | | | |
| $C_5$-$C_6$ cut | 49.9 | | | |
| Isopentane stock | 50.1 | | | |
| | iC$_5$ stock | $C_5$-$C_6$ cut | Net feed | Total prod. |
| Analysis, wt. percent (3): | | | | |
| Isobutane | 0.04 | 0.02 | | 8.1 |
| n-Butane | 0.20 | 0.10 | | 0.2 |
| Isopentane | 97.6 | 6.90 | 52.30 | 14.70 |
| n-Pentane | 2.4 | 2.55 | 2.75 | 3.3 |
| $C_5$+$C_6$ naphthenes | | 2.12 | 1.06 | |
| Paraffins: | | | | |
| $C_6$ | | 6.85 | 3.40 | 12.1 |
| $C_7$ | | .74 | 0.37 | 5.8 |
| $C_8$ | | | | 4.9 |
| $C_9$ | | | | 10.0 |
| $C_{10}$ | | | | 14.4 |
| $C_{11}$ | | | | 13.6 |
| $C_{12}+$ | | | | 7.7 |
| Olefins: | | | | |
| $C_4$ | | 1.40 | 0.70 | |
| $C_5$ | | 46.84 | 23.39 | |
| $C_6$ | | 24.81 | 12.39 | |
| $C_7$ | | 7.31 | 3.65 | |
| Isoprene | | 0.23 | 0.11 | |
| Acid oil | | | | 5.5 |
| Ratio of isoparaffin to olefin | | | 1.5 | |
| Wt. iC$_5$ consumed/wt. $C_5$-C cut | | | 0.75 | |
| Wt. acid oil/wt. $C_5$-$C_6$ cut | | | 0.11 | |
| Wt. net $C_6+$ product/wt. $C_5$-$C_6$ cut [1] | | | 1.41 | |
| Wt. iC$_4$ product/wt. $C_5$-$C_6$ cut | | | 0.16 | |
| Wt. $C_5$-$C_9$ product/wt. $C_5$-$C_6$ cut | | | .58 | |
| Wt. $C_{10}+$ product/wt. $C_5$-$C_6$ cut [2] | | | .72 | |

[1] Including acid oil. [2] Not including acid oil.

In the process of the present invention, it is preferred to limit the aromatics in the feed to the alkylation step to less than one weight percent of the net feed to the alkylation reactor, as the aromatics polymerize easily under the reaction condition of the present invention.

Although various specific embodiments of the invention have been described and shown, it is to be understood that they are meant to be illustrative only and not limiting. Certain features may be changed without departing from the spirit or essence of the invention. It is apparent that the present invention has broad application to the alkylation of isoparaffins with olefins to produce jet fuels. Accordingly, the invention is not to be construed as limited to the specific embodiments illustrated, but only as defined in the appended claim.

I claim:

1. An alkylation process for producing jet fuel from hydrocarbons which comprises:
   (a) contacting isopentane with an olefin fraction selected from the group $C_4$ to $C_{12}$ olefins, in the presence of hydrofluoric acid at a temperature between about 30° and 130° F. in a reaction zone,
   (b) maintaining a weight ratio of isopentane to olefin below 1.0 in said reaction zone, and
   (c) withdrawing from said reaction zone an effluent containing at least 10 weight percent hydrocarbons boiling in the range of about 300° to 550° F., exclusive of any acid oil produced in said reaction zone, and wherein said hydrocarbons boiling between 300° and 550° F. contain 10 volume percent or more naphthenes, and
   (d) separating said hydrocarbons of step (c) as said jet fuel.

References Cited

UNITED STATES PATENTS

| | | | |
|---|---|---|---|
| 2,335,507 | 11/1943 | Grosse et al. | 260—683.48 |
| 2,799,718 | 7/1957 | Scovill et al. | 260—683.48 |
| 3,308,053 | 3/1967 | Kelly et al. | 260—683.48 |
| 3,456,033 | 7/1969 | Borst, Jr. | 260—683.48 |
| 2,382,067 | 8/1945 | Kniel | 260—683.48 |
| 3,527,840 | 9/1970 | Price | 260—683.48 |
| 2,322,800 | 6/1943 | Frey | 260—683.48 |
| 2,403,649 | 7/1946 | Frey | 260—666 P |

DELBERT E. GANTZ, Primary Examiner

G. J. CRASANAKIS, Assistant Examiner

U.S. Cl. X.R.

208—15; 260—666 P